Sept. 24, 1935.　　　　　J. S. REID　　　　　2,015,352

HUB CAP OR THE LIKE

Filed Aug. 30, 1933

INVENTOR
James S. Reid
BY Bockett, Hyde, Higley & Mayer
ATTORNEYS

Patented Sept. 24, 1935

2,015,352

UNITED STATES PATENT OFFICE 2,015,352

HUB CAP OR THE LIKE

James S. Reid, Shaker Heights, Ohio, assignor to The Reid Products Company, Cleveland, Ohio, a corporation of Ohio Application August 30, 1933, Serial No. 687,393

2 Claims. (Cl. 301—108)

This invention relates to improvements in hub caps or the like, or in other words, in closures for the ends of tubular members, such as the internally shouldered ends of the tubular hubs of automobile wheels.

The general object of the present invention is the provision of an improved hub cap or the like which is simple and inexpensive in construction; exceedingly attractive in appearance; capable of easy modification as to ornamentation or design; readily attachable to and detachable from wheel hubs and the like; and not readily damaged in use.

A more specific object of the present invention is the provision of an improved hub cap or the like which includes a non-metallic, more or less flexible, disc-like body portion, of molded rubber or the like, and capable of being pushed or pressed inwardly, as the result of striking a street curb or the like, without being permanently deformed thereby.

Another object of the present invention is the provision of an improved hub cap or the like which includes special reenforcing means for the non-metallic body portion thereof, said means being of such character as to not interfere with the desired flexibility of said body portion.

Another object of the present invention is the provision of an improved hub cap or the like in which not only the body portion thereof but also the axially disposed, tubular portion thereof, which tubular portion carries the means for detachable locking connection with a wheel hub or the like, are of non-metallic, more or less flexible material, such as molded rubber or the like, said locking means being either of resilient character or of non-resilient character, as desired.

With the foregoing objects of the invention in view and others thereof which will appear as the description of the invention proceeds, the invention resides in the combination and arrangement of parts and in the details of construction hereinafter described and claimed, it being understood, of course, that changes in the invention as herein disclosed can be made within the scope of what is claimed, without departing from the spirit of the invention.

Figure 1:
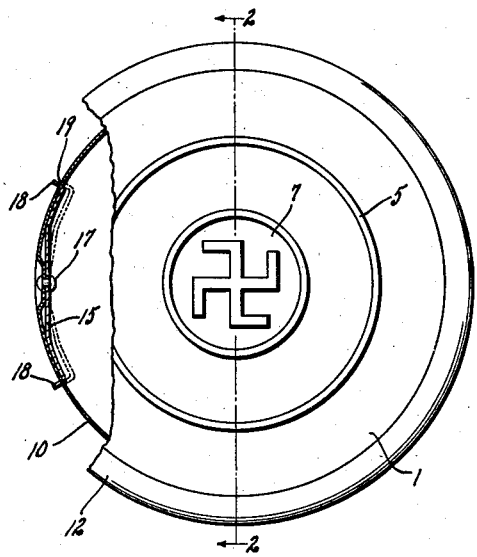
Figure 2:
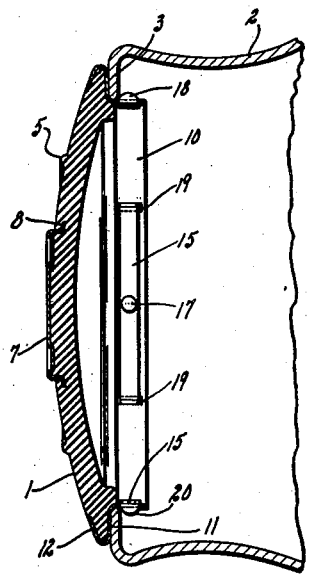

The present invention will be readily understood from the following description of several embodiments thereof, reference being had to the accompanying drawing in which Fig. 1 is a side elevation of a hub cap constructed in accordance with one embodiment of the present invention, a portion of said hub cap being broken away and in section to illustrate the locking means thereof; Fig. 2 is a longitudinal sectional view of said hub cap, taken on the line 2—2, Fig. 1, with said hub cap detachably connected to a tubular wheel hub; Figs. 3 to 8 inclusive are views similar to Fig. 2 but showing hub caps, or portions thereof, constructed in accordance with other embodiments of the invention; Fig. 9 is a detail bottom plan view of the locking means of the hub cap illustrated in Fig. 6; and Fig. 10 is a detail sectional view showing the hub cap of Fig. 7 in the process of being applied to or removed from a wheel hub.

Referring to the embodiment of the invention shown in Figs. 1 and 2, the body portion 1 of the hub cap of that embodiment is a disc-like, outwardly curved or dished-shaped, non-metallic member of a size sufficient to cover and thereby close the open outer end of a tubular wheel hub 2, said hub being provided at its outer end with an annular, internal shoulder 3, formed by turning the metal of said end radially inwardly, as shown. In its preferred embodiments, said body portion 1 is of rubber or the like, molded or otherwise formed into the desired shape and possessing sufficient flexibility to enable it to be pushed or pressed inwardly, as the result of striking a street curb or the like, without being permanently deformed thereby.

Figure 3:
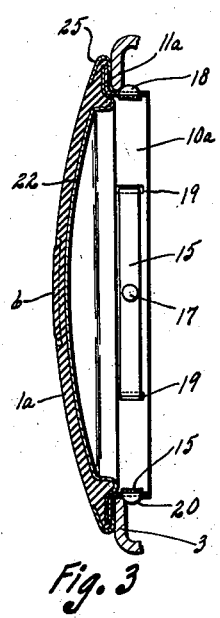

If desired, the outer surface of said body portion may be provided with a suitable design or with suitable ornamentation, such as by properly shaping, at the time said body portion is made, for example, the material of said body portion, of which type of ornamentation or design the annular rib or ridge 5 is illustrative, or said design or ornamentation may be provided by properly coloring all or a part of the outer surface of said body portion, which coloring may be produced, for example, by using colored rubber or the like in making said body portion, of which type of ornamentation or design the colored rubber, disc-like, body portion part 6, Fig. 3, is illustrative, or said design or ornamentation may be provided by suitably securing to the outer surface of said body portion separate ornamental means, such as the emblem-bearing or otherwise ornamented metal disc 7 having its peripheral edge portion 8 offset and embedded in the material of said body portion.

For detachably connecting said body portion 1 to the tubular wheel hub 2, with said body portion in closing or covering position relative to the open outer end of said hub, the hub cap of Figs. 1 and 2 includes an axially disposed, tubular metal portion 10 having an outwardly extending, annular flange 11 folded or crimped inwardly, at its outer edge, about the peripheral edge of the disc-like body portion 1, as indicated at 12, Fig. 2. The diameter of said cap tubular portion 10 is therefore less than that of the cap body portion 1, said tubular portion being of such size that it is just enabled to readily enter the open outer end of the tubular wheel hub 2.

Suitably secured to this tubular portion 10 of the hub cap is the locking means thereof, which means is adapted for detachable locking connection with the inwardly extending, annular flange 3 of the wheel hub 2. As shown, the locking means of the hub cap of Figs. 1 and 2 comprises a plurality of opposed, spring metal locking strips 15, the use of three such strips being preferable, said strips being longitudinally secured, in circumferentially spaced relation, along the inner surface of the cap tubular portion 10, rivets 17 or the like being used to secure said strips, at their mid-points, for example, to said tubular portion 10. The outwardly bent ends 18 of said strips constitute the locking parts thereof, said ends projecting outwardly through suitable slots 19 in said cap tubular portion 10 a sufficient distance to enable them to yieldingly engage and interlock with the inwardly extending, annular flange 3 of the wheel hub 2. To enable said locking strip ends to be readily moved radially inward, to non-locking position, upon straight line movement of the hub cap relative to the wheel hub, which movement occurs in applying the cap to and in removing it from the wheel hub, the corners of said strip ends are cut away, as at 20, so that said ends are of generally semi-circular shape. As a result, when the hub cap is applied to the wheel hub, the locking strip ends 18 are moved radially inward by the engagement of their curved edges with the inwardly extending hub flanges 3, thereby enabling the cap tubular portion 10 carrying said locking strip ends to enter the wheel hub and said strip ends to snap back of or behind the hub flange 3, with consequent detachable locking connection of the hub cap to said wheel hub.

To remove the hub cap from said wheel hub, it is merely necessary to pull said hub cap outwardly or from said hub, the curved edges of the locking strip ends 18 of said cap, by their engagement with the hub flange 3, causing said ends to move inwardly to non-locking position, after which said hub cap is free to be withdrawn from said wheel hub, all as will be readily understood.

In the embodiment of the invention shown in Fig. 3, the non-metallic flexible body portion 1a, of rubber or the like, is provided with a metallic backing plate 22, of a shape and size corresponding to those of the body portion 1a and possessing sufficient flexibility to enable it to be pushed or pressed inwardly, with said body portion, without suffering permanent deformation as the result thereof. In the hub cap of this embodiment of the invention, the non-metallic body portion 1a, the metallic backing plate 22 therefor, and the outwardly extending, annular flange 11a of the tubular portion 10a are secured together and maintained in assembled relation by an annular metallic bead 25 crimped about the peripheral edges of said parts, as shown. As before mentioned, the body portion 1a of this hub cap has its outer surface ornamented by having the disc-like part 6 thereof formed of rubber or the like differing in color from the rubber or the like of which the rest of said body portion is made.

Figure 5:
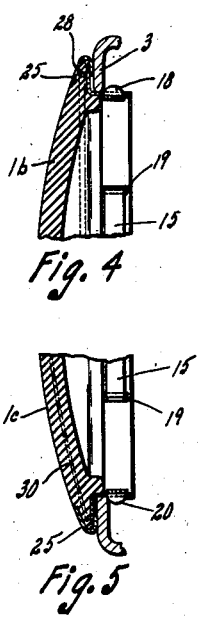
Figure 4:
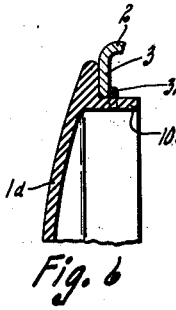

As shown, the hub caps of Figs. 4 and 5 differ from the hub cap of Fig. 3 in that there is no backing support for the non-metallic body portions thereof. For re-enforcing the more or less flexible body portion 1b of the hub cap of Fig. 4, which body portion may be made of rubber or the like, a wire ring 28 is embedded in the margin or peripheral edge of said portion, and for reenforcing the more or less flexible body portion 1c of the hub cap of Fig. 5, which portion also may be made of rubber or the like, a wire screen 30 or the like is longitudinally embedded in said body portion, said screen extending throughout substantially the entire area thereof, as shown.

Figure 6:
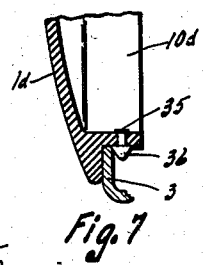
Figure 7:
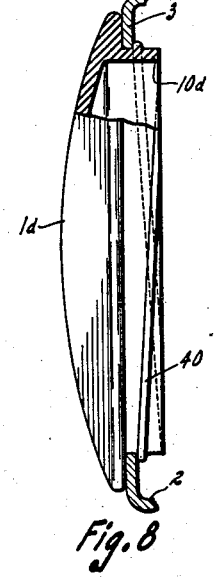
Figure 8:
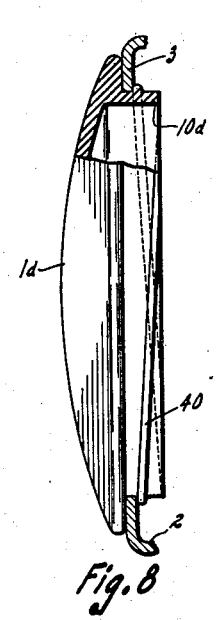
Figures 9, 10:
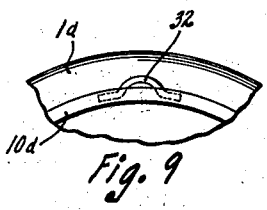

In the embodiments of the invention shown in Figs. 6, 7 and 8, not only are the body portions 1d of the hub caps thereof made of non-metallic, more or less flexible material, such as rubber or the like, but also, the axially disposed, tubular portions 10d of such hub caps are made of such material, being preferably formed integral with said body portions.

The locking means of the hub cap of Fig. 6 is in the form of resilient wire sections 32, there being preferably three of such sections arranged longitudinally in circumferentially spaced relation about the outer surface of the tubular portion 10d of the cap. As best shown in Fig. 9, the ends of each of said wire sections are embedded in the material of which said cap tubular portion 10d is made and the intermediate portion of each of said wire sections is bent outwardly for detachable locking engagement with the inwardly extending, annular flange 3 of the wheel hub 2.

In the hub cap of Fig. 7, the locking means thereof is in the form of metal rivets 35 secured to the tubular portion 10d of said cap in circumferentially spaced relation, said rivets having tapered outer heads 36 which are adapted for detachable locking engagement with the wheel hub flange 3. During application and removal of the hub caps of Figs. 6 and 7 to and from the wheel hub 2, the axially disposed tubular portions 10d of said caps yield inwardly sufficiently to enable the locking projections carried thereby (the wire sections 32 of Fig. 6 or the metal rivets 36 of Fig. 7) to pass the inwardly extending, annular flange 3 of the wheel hub 2, such inward yielding of said tubular portion 10d of the hub cap of Fig. 7 being shown in Fig. 10.

In the embodiment of the invention shown in Fig. 8, the locking means of the hub cap thereof is in the form of a screw thread 40, said thread being adapted for detachable locking engagement with the inwardly extending, annular flange 3 of the wheel hub 2. Said thread, as here shown, is integral with the tubular portion 10d of the hub cap, it being made, therefore, of some such flexible material as rubber or the like.

From the foregoing, it will be apparent that I have provided a hub cap or the like which may embody any one of several types of means for effecting its detachable connection to a tubular wheel hub or the like, said hub cap or the like having a disc-like body portion of non-metallic, more or less flexible material, such as rubber or the like whereby said body portion, upon being pushed or pressed inwardly, as the result of striking a street curb or the like, will suffer no permanent deformation as the result thereof. Furthermore, said body portion is capable of being provided with a design or with ornamentation in any one or more of several different ways.

Further features of the present invention will be apparent to those skilled in the art to which it relates.

What I claim is:

1. A hub cap for the centrally disposed opening in the end face of a wheel hub, said hub cap comprising a generally flexible face plate of molded rubber, and means secured thereto for releasable locking connection with such a wheel hub end face, the marginal portion of said hub cap face plate being adapted to cover at least a part of the wheel hub end face around the opening therein and said locking means being adjacent but spaced from the outer edge of said hub cap face plate and being adapted to extend into the opening of said wheel hub end face.

2. A hub cap for the centrally disposed opening in the end face of a wheel hub, said hub cap comprising a generally flexible face plate of molded rubber, and a skirt integral therewith and provided with locking projections adapted for releasable locking connection with such a wheel hub end face, said skirt being adapted to enter the opening of said wheel hub end face and the marginal portion of said face plate being adapted to cover at least a portion of the wheel hub end face around the opening thereof.

JAMES S. REID.